US011455422B2

(12) United States Patent
Bayon et al.

(10) Patent No.: US 11,455,422 B2
(45) Date of Patent: Sep. 27, 2022

(54) PERIODIC GENERATION OF RANDOM FUNCTION IN THE CLOUD

(71) Applicant: AMADEUS S.A.S., Biot (FR)

(72) Inventors: Roman Bayon, Antibes (FR); Michele Minelli, Zaventem (BE); Sylvain Florent Frederic Palmier, Antibes (FR); Dinh Cuong Tran, Antibes (FR); Giuseppe Turelli, Chiari (IT)

(73) Assignee: Amadeus S.A.S., Biot (FR)

( * ) Notice: Subject to any disclaimer, the term of this patent is extended or adjusted under 35 U.S.C. 154(b) by 122 days.

(21) Appl. No.: 17/063,791

(22) Filed: Oct. 6, 2020

(65) Prior Publication Data
US 2021/0117570 A1 Apr. 22, 2021

(30) Foreign Application Priority Data
Oct. 17, 2019 (FR) ...................................... 1911573

(51) Int. Cl.
*G06F 21/62* (2013.01)
*H04L 9/08* (2006.01)

(52) U.S. Cl.
CPC ...... *G06F 21/6245* (2013.01); *G06F 21/6218* (2013.01); *H04L 9/0861* (2013.01); *H04L 9/0869* (2013.01); *H04L 2209/08* (2013.01)

(58) Field of Classification Search
CPC .. G06F 21/62; G06F 21/6218; G06F 21/6245; H04L 9/0861; H04L 9/0869; H04L 2209/08
See application file for complete search history.

(56) References Cited

U.S. PATENT DOCUMENTS

| 8,458,487 | B1 | 6/2013 | Palgon et al. |
| 8,739,262 | B2* | 5/2014 | Harper .................. G06Q 30/06 726/9 |
| 8,978,152 | B1* | 3/2015 | Rozenberg .......... H04L 63/0428 726/26 |
| 2006/0080546 | A1* | 4/2006 | Brannon ................ H04L 63/08 713/185 |
| 2011/0154466 | A1* | 6/2011 | Harper .................. G06Q 30/06 726/9 |
| 2013/0212007 | A1 | 8/2013 | Mattsson et al. |

(Continued)

OTHER PUBLICATIONS

National Institute of Industrial Property, Preliminary Search Report issued in Application No. 1911573 dated Jun. 23, 2020.

*Primary Examiner* — Daniel B Potratz
*Assistant Examiner* — D'Arcy Winston Straub
(74) *Attorney, Agent, or Firm* — Thompson Hine LLP

(57) ABSTRACT

Systems and methods for processing tokenization requests to facilitate safe storage of tokens. An epoch is identified as a current epoch based on a current system time of a node. A seed value is computed by the node based on a start time of the epoch and a secret. A plurality of ephemeral tokens is generated by a randomization service of the node for a set of sensitive data based on the seed value. Each ephemeral token of the plurality of ephemeral tokens has a usable life defined by the epoch. Each sensitive data instance in the set of sensitive data is associated with a particular ephemeral token of the plurality of ephemeral tokens to create a mapping structure in a main memory of the node. A tokenization service of the node is configured to process tokenization requests using the mapping structure.

18 Claims, 5 Drawing Sheets

(56) References Cited

U.S. PATENT DOCUMENTS

| | | | |
|---|---|---|---|
| 2015/0096038 A1* | 4/2015 | Mattsson | H04L 9/0637 726/26 |
| 2018/0082072 A1 | 3/2018 | Hosie et al. | |
| 2018/0357426 A1* | 12/2018 | Pearson | G06F 21/6254 |

* cited by examiner

PERIODIC GENERATION OF RANDOM FUNCTION IN THE CLOUD

TECHNICAL FIELD

The present invention relates generally to tokenization processes, although not limited thereto. More specifically, the present invention relates to techniques for creating in-memory sensitive data to ephemeral token mappings.

BACKGROUND

Some electronic data stored on computing devices or exchanged between computing devices over communication channels coupling such devices includes sensitive data. Examples of such sensitive data includes: credential information (e.g., password, user name, etc.), electronic Personal Health Information, Primary Account Numbers, social security numbers, credit card numbers, and the like. In some instances, an unauthorized person may obtain such sensitive data for nefarious purposes. Consequently, various techniques are used to mitigate exposure of such sensitive data to unauthorized persons.

One such technique used to mitigate exposure of sensitive data to unauthorized persons is known as data tokenization. Data tokenization or tokenization generally refers to a process of replacing sensitive data with non-sensitive data. As explained by the Payment Card Industry ("PCI") Security Standards Council "[t]he security objective of a tokenization process is to ensure the resulting token has no value to an attacker." To that end, a tokenization process is configured to generate "tokens" (i.e., tokenized versions of sensitive data) that lack any extrinsic meaning or value. Since tokens lack any extrinsic meaning or value, mapping data is generally retained that maps each token back to the sensitive data it replaces. Such mapping data may facilitate deriving replaced sensitive data from a corresponding token.

Thus, improved techniques of tokenizing sensitive data and enhancing security of token mapping data are needed to meet the security objective of a tokenization process.

SUMMARY

Embodiments of the present invention provide systems, methods, and computer-readable storage media for tokenizing sensitive data and enhancing security of token mapping data. In an embodiment, a system includes a node, a processor, and a computer-readable storage medium that includes instructions. Upon execution by the processor, the instructions cause the system to perform operations. The operations include identifying an epoch as a current epoch based on a current system time of the node. A seed value is computed by the node based on a start time of the epoch and a secret. A plurality of ephemeral tokens is generated by a randomization service of the node for a set of sensitive data based on the seed value. Each ephemeral token in the plurality of ephemeral tokens has a usable life defined by the epoch. Each sensitive data instance in the set of sensitive data is associated with a particular ephemeral token of the plurality of ephemeral tokens to create a mapping structure in a main memory of the node. A tokenization service of the node is configured to process tokenization requests using the mapping structure.

In another embodiment, a method includes identifying an epoch as a current epoch based on a current system time of a node. A seed value is computed by the node based on a start time of the epoch and a secret. A plurality of ephemeral tokens is generated by a randomization service of the node for a set of sensitive data based on the seed value. Each ephemeral token in the plurality of ephemeral tokens has a usable life defined by the epoch. Each sensitive data instance in the set of sensitive data is associated with a particular ephemeral token of the plurality of ephemeral tokens to create a mapping structure in a main memory of the node. A tokenization service of the node is configured to process tokenization requests using the mapping structure.

In another embodiment, a non-transitory computer-readable storage medium including computer-readable instructions is provided. Upon execution by a processor of a computing device, the computer-readable instructions cause the computing device to identify an epoch as a current epoch based on a current system time of the node. A seed value is computed by the node based on a start time of the epoch and a secret. A plurality of ephemeral tokens is generated by a randomization service of the node for a set of sensitive data based on the seed value. Each ephemeral token in the plurality of ephemeral tokens has a usable life defined by the epoch. Each sensitive data instance in the set of sensitive data is associated with a particular ephemeral token of the plurality of ephemeral tokens to create a mapping structure in a main memory of the node. A tokenization service of the node is configured to process tokenization requests using the mapping structure.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
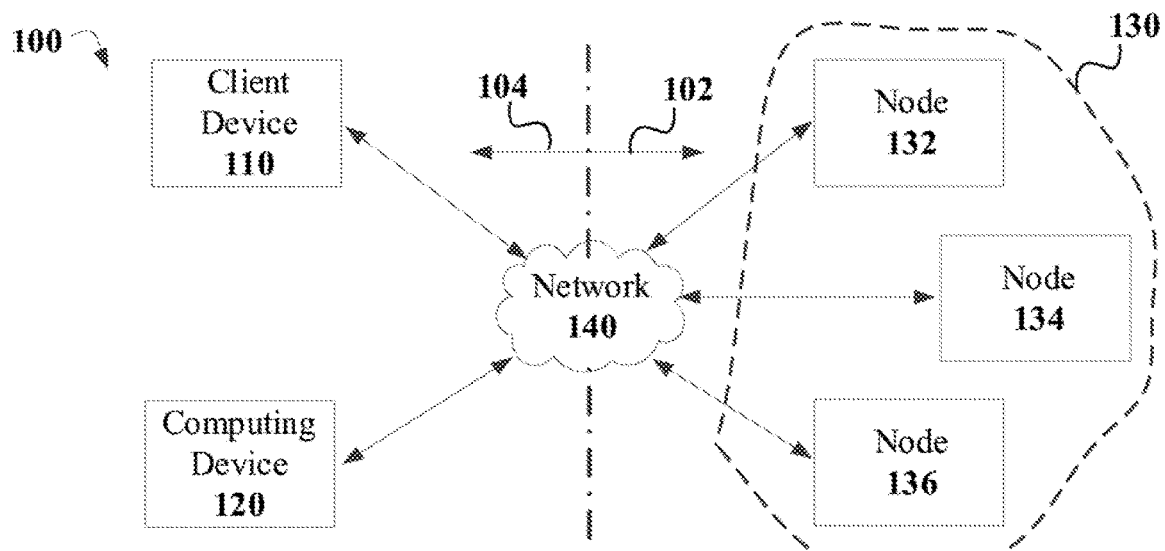
FIG. 1 is a block diagram of an example operating environment that is suitable for implementing aspects of the present invention.

Techniques described herein relate to tokenizing sensitive data and enhancing security of token mapping data. Referring to FIG. 1, an example operating environment for implementing aspects of the present invention is illustrated and designated generally 100. Operating environment 100 includes client device 110, computing device 120, and distributed tokenization platform 130. FIG. 1 depicts the various computing devices as communicating with each other via networks (e.g., network 140), which may include one or more public and/or private networks. Examples of networks that are suitable for implementing network 140 include: local area networks (LANs), wide area networks (WANs), cellular networks, the Internet, and the like.

Within operating environment 100 is a trusted environment 102 and an untrusted environment 104. Trusted environment 102 represents a portion of operating environment 100 that is, at least, partially partitioned from other portions of operating environment 100, such as untrusted environment 104. By way of example, trusted environment 102 may be partitioned from other portions of operating environment 100 using physical barriers (e.g., fences), logical barriers (e.g., firewalls), and the like. Through such partitioning, trusted environment 102 and untrusted environment 104 may implement different security measures providing different levels of protection for data stored and/or communicated within each respective environment. As a result, a likelihood that an unauthorized person is able to compromise data stored and/or communicated within each respective environment of operating environment 100 may be different.

For example, trusted environment 102 may implement security measures that provide a greater level of protection for data stored and/or communicated within trusted environment 102 than is provided by security measures implemented by untrusted environment 104 for data stored and/or communicated within untrusted environment 104. In this example, an unauthorized person would be more likely to compromise data stored and/or communicated within untrusted environment 104 than they would data stored and/or communicated within trusted environment 102. By extension, if such data included sensitive data, an unauthorized person would likewise be more likely to compromise sensitive data stored and/or communicated within untrusted environment 104 than they would sensitive data stored and/or communicated within trusted environment 102.

As used herein, "sensitive data" refers to any information concerning an entity that may subject the entity to heightened risk or loss of an advantage if compromised, lost, or inadvertently disclosed through unauthorized access. Examples of sensitive data include: credential information (e.g., password, user name, etc.); personally identifiable information ("PIP") (e.g., social security numbers, passport numbers, etc.); electronic Personal Health Information ("PHI"); financial data (e.g., credit card numbers, bank account numbers, etc.).

In operating environment 100, tokenization is implemented to minimize the exposure of sensitive data to unauthorized persons in untrusted environment 104, as described in greater detail below. To that end, computing devices within untrusted environment 104, such as client device 110 and computing device 120, submit tokenization requests including sensitive data to a node (e.g., node A 132, node B 134, or node C 136) of platform 130. In response to such tokenization requests, nodes of platform 130 return tokens. Generally, a "token" refers to non-sensitive data lacking any extrinsic meaning or significance that serves as a proxy for associated sensitive data. In various embodiments, a token may be generated randomly, generated pseudo-randomly, obtained from a counter output, selected from among a set of previously defined values, and the like. Examples of suitable values for implementing tokens include: numeric values, alphabetic values, alphanumeric values, and the like.

By way of example, client device 110 may need to exchange credit card information with computing device 120 during a transaction. To minimize exposure of the credit card information to unauthorized persons in untrusted environment 104, client device 110 may submit a tokenization request to a node of platform 130. The tokenization request submitted by client device 110 may include the credit card information. In response to the tokenization request, client device 110 may receive, from the node of platform 130, a tokenization response comprising a token mapped to the credit card information. Instead of transmitting the credit card information to computing device 120, client device 110 transmits the token mapped to the credit card information.

In operating environment 100, a computing device may transmit a detokenization request including a token to a node of platform 130 to retrieve sensitive data associated with the token. In response to the detokenization request, the computing device 120 may receive, from the node of platform 130, a detokenization response comprising a particular instance of sensitive data mapped to the token, as described in greater detail below. Continuing with the example above, computing device 120 may transmit a detokenization request to a node of platform 130 that includes the token received from client device 110. In response to the detokenization request, the node of platform 130 may transmit a detokenization response to computing device 120 that includes the credit card information that was included in the tokenization request submitted by client device 110.

A particular token may be characterized as either "ephemeral" or "non-ephemeral" based on its respective usable lifetime. As used herein, a "useable lifetime" of a token denotes a period of time in which a mapping structure comprising the token is used by distributed tokenization platform 130 for processing tokenization requests and/or detokenization requests. Specifically, a token is characterized as an ephemeral token when its respective usable lifetime is limited. In an embodiment, the period of time defining a useable lifetime of an ephemeral token is less than a minute (e.g., a few seconds). In an embodiment, the period of time defining a useable lifetime of an ephemeral token is less than an hour (e.g., dozens of minutes). Alternatively, a token is characterized as a non-ephemeral token when little to no restrictions are placed on its respective usable lifetime. For example, the period of time defining a useable lifetime of a non-ephemeral token exceeds a year (e.g., a few years). As discussed in greater detail below and in accordance with various embodiments, the tokens included in the tokenization responses transmitted by nodes of distributed tokenization platform 130 and the detokenization requests received by such nodes are ephemeral tokens.

Figure 9:
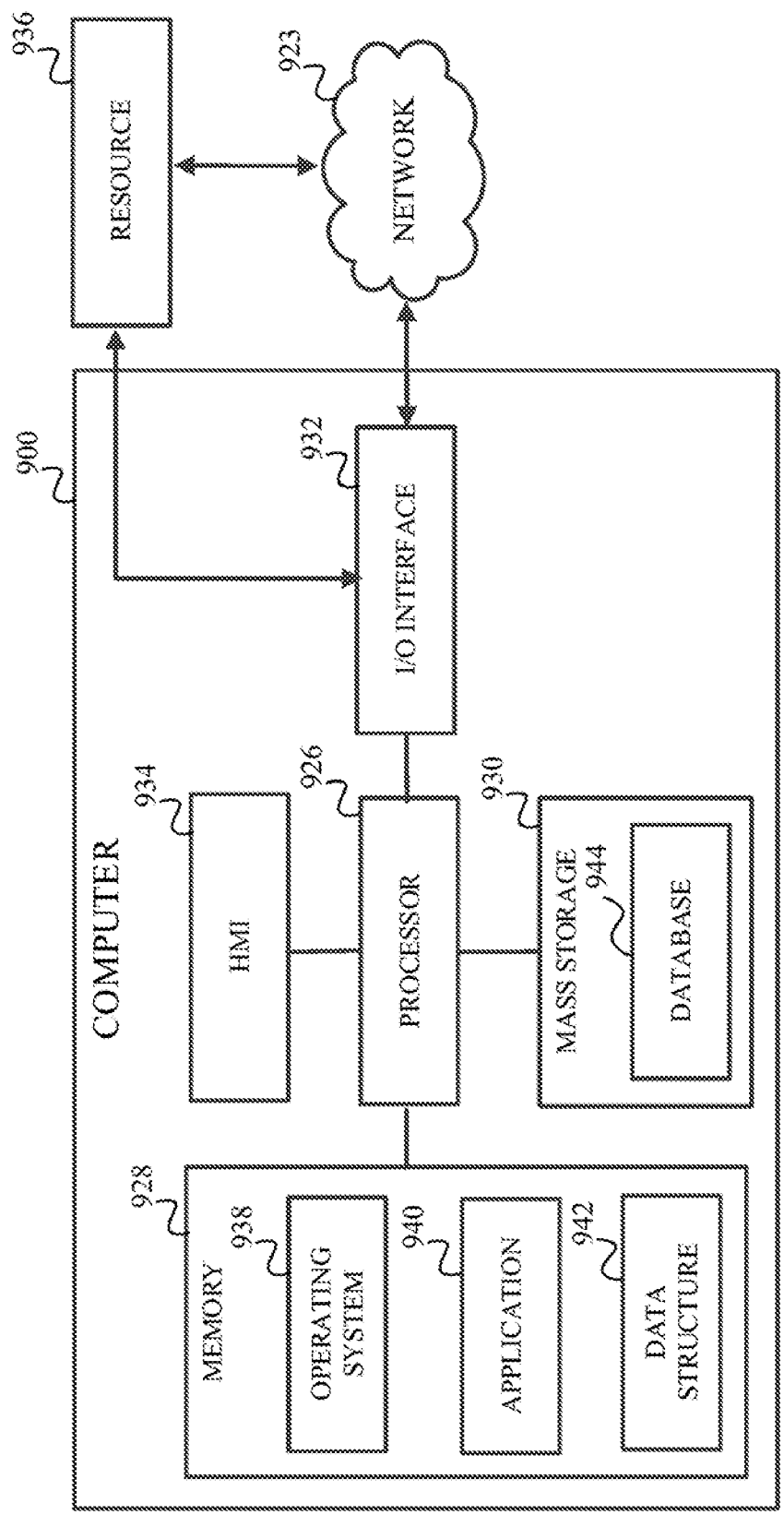
FIG. 9 is a block diagram of an example computing environment suitable for use in implementing embodiments of the invention.

Each of the systems shown in FIG. 1 may be implemented via any type of computing system, such as computer system 900 described in greater detail below with respect to FIG. 9.

Each system shown in FIG. 1 may comprise a single device or multiple devices cooperating in a distributed environment. For instance, nodes 132-136 and/or distributed tokenization platform 130 may be provided via multiple devices arranged in a distributed environment that collectively provide the functionality described herein. Additionally, other components not shown may also be included within the distributed environment.

Figure 2:
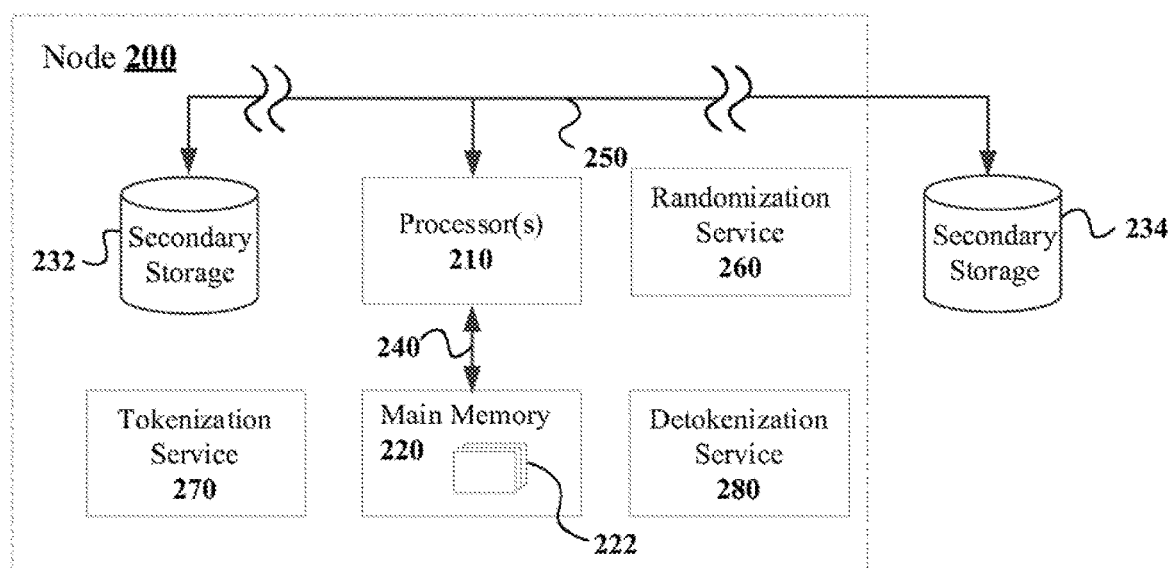
FIG. 2 is a block diagram of an example node that is suitable for implementing aspects of the invention described herein.

FIG. 2 is a block diagram of an example node 200 that is suitable for implementing aspects of the invention described herein. In an embodiment, nodes 132, 134, and/or 136 of FIG. 1 may be implemented using node 200. Node 200 includes processor (or execution core) 210, main memory 220, and a secondary storage. The secondary storage may be implemented as internal secondary storage 232, external secondary storage 234, or a combination thereof. Instructions stored in main memory 220 and/or the secondary storage upon execution by processor 210 implement a number of services, processes, or routines. Those services include: randomization service 260, tokenization service 270, and detokenization service 280.

Main memory 220 is configured to store data (e.g., memory structure 222) that is currently in use by active services, processes, or routines effectuated by processor 210. In node 200, main memory 220 is directly accessible by processor 210 via system (or memory) bus 240. The secondary storage (e.g., internal secondary storage 232 and/or external secondary storage 234) provides node 200 with persistent memory for storing data-at-rest. Data-at-rest generally refers to data that is either not being processed by processor 210 or not stored in main memory 220.

Unlike main memory 220, the secondary storage is not directly accessible by processor 210 in node 200. Instead, processor 210 indirectly accesses the secondary storage using input/output bus 250. That is, processor 210 interacts with one or more intervening components to access data stored in the secondary storage. For example, internal secondary storage 232 may be implemented as an electromechanical or solid state hard drive. In this example, processor 210 interacts with a controller that manages memory space provided by internal secondary storage 232. As another example, external secondary storage 234 may be implemented as a network attached storage device. In this example, processor 210 interacts, at least, with a network interface to access data stored in external secondary storage 234.

Randomization service 260 is configured to generate ephemeral tokens based on seed values, as discussed in greater detail below. Tokenization service 270 is configured to process tokenization requests received from computing devices (e.g., client device 110 of FIG. 1) external to node 200 using mapping structures populated with ephemeral tokens generated by randomization service 260, as discussed in greater detail below. Detokenization service 280 is configured to process detokenization requests received from computing devices (e.g., computing device 120 of FIG. 1) external to node 200 using mapping structures populated with ephemeral tokens generated by randomization service 260, as discussed in greater detail below.

Figure 3:
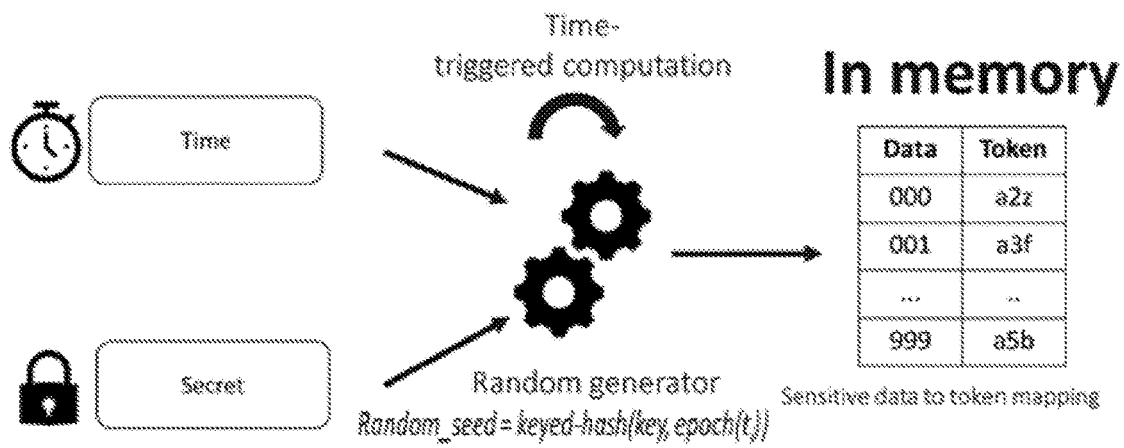
FIG. 3 illustrates a high-level overview of creating in-memory sensitive data to ephemeral token mappings in accordance with an embodiment of the present invention.

FIG. 3 illustrates a high-level, conceptual overview of aspects of creating in-memory sensitive data to ephemeral token mappings in accordance with an embodiment of the present invention. As discussed above, tokenization processes replace sensitive data with non-sensitive data to mitigate exposure of that sensitive data to unauthorized persons. Such tokenization processes secure sensitive data by generating tokens that lack any extrinsic meaning or value to an attacker or unauthorized person.

Some existing tokenization techniques utilize cryptographic tokens corresponding to encrypted versions of the sensitive data being replaced. Yet, cryptographic tokens only lack value to an attacker as long as an underlying encryption technique used to generate such tokens remains secure. If the underlying encryption technique becomes compromised (e.g., an unauthorized person obtains a private key of a key-based encryption technique), each cryptographic token generated by that encryption technique becomes compromised. By way of example, an unauthorized person may directly retrieve sensitive data from a cryptographic token by decrypting it using a compromised private key.

Other existing tokenization techniques utilize random tokens corresponding to randomly (or pseudo-randomly) generated values as proxies for particular instances of sensitive data. In as much as the randomly (or pseudo-randomly) generated values of a random token generally lack any pattern or correlation with the sensitive data being replaced, an unauthorized person is typically unable to directly retrieve that sensitive data from the random token. However, the randomness that thwarts unauthorized persons from directly retrieving sensitive data from random tokens comes with increased reliance on mapping structures by authorized persons to retrieve that sensitive data. Therefore, tokenization techniques that use random tokens generally require databases or token vaults to retain such mapping structures.

That database or token vault requirement renders such existing random tokenization techniques difficult to implement in a multi-datacenter architecture. For example, consistent sensitive data to token mappings must be maintained in each mapping structure within a multi-datacenter architecture to avoid token collisions across datacenters. Achieving consistent sensitive data to token mappings in each mapping structure generally requires some form of synchronization between datacenters of the multi-datacenter architecture or even between nodes within a given datacenter. In some instances, that intra-datacenter (or intra-node) synchronization must occur each time tokenization occurs in accordance with existing random tokenization techniques. As such, synchronization operations typically occur each time a mapping structure at any datacenter (or node of a given datacenter) is updated with an additional sensitive data to token mapping or refreshed with new sensitive data to token mappings.

Embodiments of the present disclosure facilitate retaining the benefits of using random tokens while minimizing the difficulty of implementing random tokenization in a multi-datacenter environment. To that end, one aspect of the present disclosure involves using a secret and a current system time to create in-memory sensitive data to ephemeral token mappings ("mapping structures"). In the context of the current disclosure a "secret" denotes a secure value that is analogous to a "private key" in that it is generally only provided to intended recipients. Copies of a given secret may be provided to each node (or datacenter) for local storage prior to use in creating mapping structures. In doing so, the creation of mapping structures may thereby occur independently at each node using locally available data.

Moreover, a system time source of each node may be synchronized with a common time source prior to creating such mapping structures. Minimizing deviance between a respective system time source of each node facilitates consistency between the independently created mapping structures. As illustrated in FIG. 3, mapping structures may be created at each node with a randomization service (e.g., randomization service 260 of FIG. 2) executing using computing resources (e.g., processor 210 and main memory 220 of FIG. 2) of that node. A seed value may locally computed to set an initial state of the randomization service for generating ephemeral tokens to populate a given mapping structure. Upon setting the initial state of the randomization service, subsequent states of the randomization service may become deterministic. For example, if a common seed value is used to set an initial state of a randomization service at each node for generating ephemeral tokens, the ephemeral tokens generated by each randomization service will be consistent. To the extent that the same secret is used to locally compute a seed value at each node, discrepancies in seed values and ephemeral tokens generated from those values may be associated with node-to-node system time deviations.

The temporal component of seed values introduced through use of system time sources further facilitates the ephemeral nature of tokens generated from such seed values. For example, seed value computations may become time-triggered computations by scheduling a plurality of pre-defined times for computing seed values. In this example, a background process at each node may monitor a current system time relative to the plurality of pre-defined times. When the background process determines that the current system time corresponds to a particular pre-defined time, a trigger could be issued causing that node to compute a seed value based on the current system time and a secret. In turn, the seed value may be passed to a corresponding randomization service that generates a plurality of ephemeral tokens based on the seed value for populating a mapping structure. By repeating those operations for each of the plurality of pre-defined times, mapping structures may be periodically refreshed as illustrated in FIG. 4.

Figure 4:
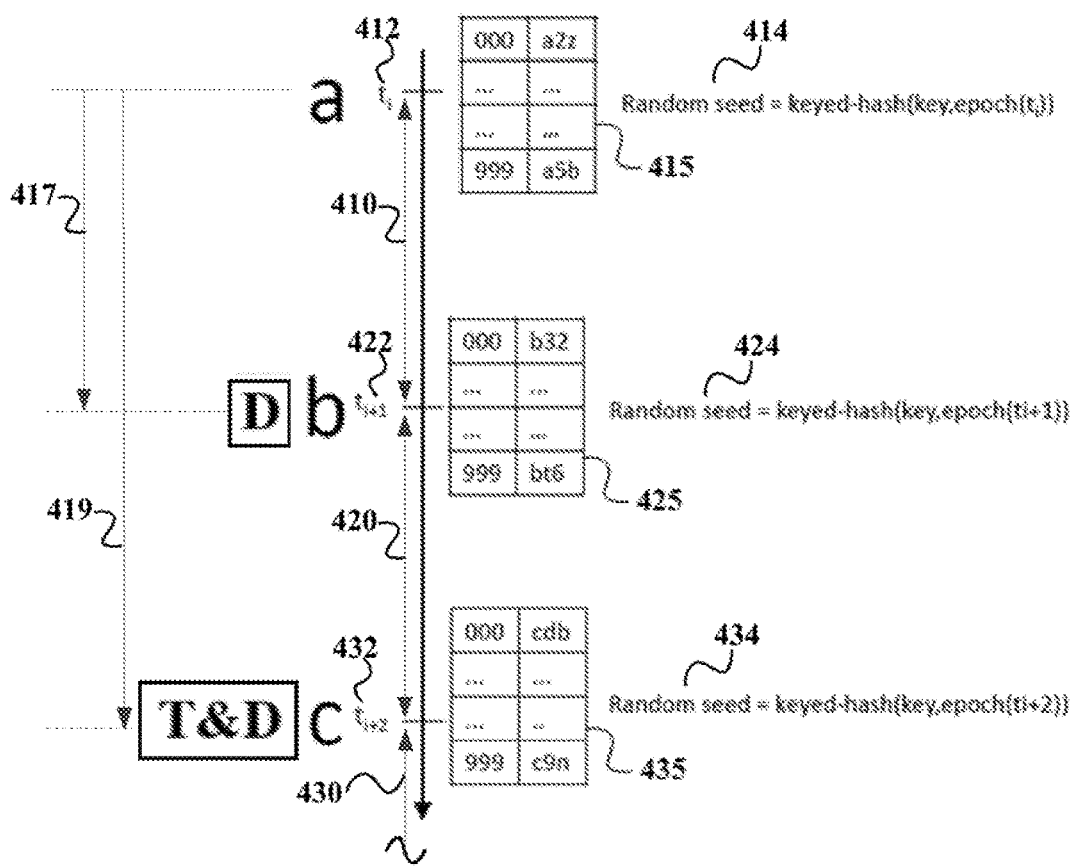
FIG. 4 depicts a timeline showing periodic refreshing of in-memory sensitive data to ephemeral token mappings in accordance with an embodiment of the present invention.

In FIG. 4, a plurality of pre-defined times are represented along a timeline by designators 412, 422, and 432. Those plurality of pre-defined times partition the timeline into a plurality of time periods (or epochs) represented by designators 410, 420, and 430. Each epoch among the plurality of epochs has a duration defined by its associated start time and a start time of an epoch immediately following that epoch. For example, first epoch 410 has a duration defined by start time 412 and start time 422 of second epoch 420. As another example, second epoch 420 has a duration defined by start time 422 and start time 432 of third epoch 430. In an embodiment, first epoch 410, second epoch 420, and third epoch 430 have equivalent durations. In an embodiment, the duration of first epoch 410 is different from the respective durations of second epoch 420 and third epoch 430.

Over a duration of a given epoch, that epoch is identified as a "current epoch". When the duration of the given epoch concludes at the start time of the epoch immediately following the given epoch, a new epoch (i.e., the epoch immediately following the given epoch) is identified as the current epoch. Continuing with the example above, a first trigger may be issued when a background process of a particular node (e.g., node 132, 134, or 136 of FIG. 1) determines that the current system time corresponds to start time 412 of first epoch 410. At start time 412, first epoch 410 is identified as a current epoch. In response to the first trigger, the particular node computes a first seed value 414. A first plurality of ephemeral tokens is generated based on the first seed value 414 by a randomization service (e.g., randomization service 260 of FIG. 2) of the particular node for populating a first mapping structure 415.

As noted above, the use of system time sources to compute seed values facilitates the ephemeral nature of tokens generated from such seed values. Using system time sources to compute seed values may also facilitate with a common token being independently generated for a given instance of sensitive data by each node of a distributed tokenization platform. In doing so, the risk of token collisions across the distributed tokenization platform may be reduced. To that end, each ephemeral token among the first plurality of tokens comprising first mapping structure 415 has a usable life defined by first epoch 410. In one respect, first epoch 410 defines that usable life by configuring a tokenization service (e.g., tokenization service 270) of the particular node to process tokenization requests using first mapping structure 415 for a duration of first epoch 410. Stated differently, the tokenization service of the particular node may be configured to process tokenization requests using first mapping structure 415 for duration 417. A second trigger may be issued when the background process determines that the current system time corresponds to start time 422 of second epoch 420 and second epoch 420 is identified as the current epoch. In response to the second trigger, the particular node computes a second seed value 424 and a second plurality of ephemeral tokens is generated based on the second seed value 424 by the randomization service for populating a second mapping structure 425. The tokenization service is then configured to process tokenization requests for a duration of second epoch 420 using second mapping structure 425.

Upon configuring the tokenization service to process tokenization requests using second mapping structure 425, the tokenization service no longer processes such requests using first mapping structure 415. However, first mapping structure 415 remains usable by other services of the particular node during second epoch 420. For example, a detokenization service of the particular node may be configured to process detokenization requests using first mapping structure 415 for duration 419.

As illustrated by FIG. 4, the same set of sensitive data persists in each mapping structure. Yet, a particular sensitive data instance in that set of sensitive data is associated with a different ephemeral token in each mapping structure associated with one of the plurality of epochs. For example, in first mapping structure 415, the "000" sensitive data instance is associated with the "a2z" ephemeral token. However, in second mapping structure 425, the "000" sensitive data instance is associated with the "b32" ephemeral token. This illustrates another aspect of the present disclosure in which ephemeral tokens are versioned.

In the example of FIG. 4, that versioning of ephemeral tokens is represented by the lowercase letters associated with each epoch start time. For example, first epoch 410 is associated with version "a", second epoch 420 is associated with version "b", and third epoch 430 is associated with version "c". In an embodiment, each ephemeral token includes a version identifier indicative of a version associated with an epoch in which that token was generated. In FIG. 4, each version identifier is represented by appending the lowercase letter of a corresponding version as a prefix to each ephemeral token.

One skilled in the art may recognize that version identifiers can take other forms and be incorporated into ephemeral tokens in other ways. For example, version identifiers may be implemented as one or more values comprising: numeric values, alphabetic values, alphanumeric values, and the like. As another example, version identifiers may be incorporated into ephemeral tokens by appending version identifiers as a suffix to each ephemeral token or by inserting version identifiers within a sequence of values forming each ephemeral token. As another example, version identifiers may be incorporated into ephemeral tokens by appending version identifiers as a prefix to each ephemeral token. FIG. 4 illustrates an embodiment of this example in which version identifiers are appended as a first character of a given ephemeral token. In an embodiment, a form of version identifier used in one epoch may be different from a form of version identifier used in another epoch. In an embodiment, version identifiers may be incorporated into ephemeral tokens in a first manner for one epoch whereas version identifiers may be incorporated into ephemeral tokens in a second manner that is different from the first manner for another epoch. In this embodiment, it remains possible to identify a respective version identifier of each ephemeral token received regardless of which manner that version identifier was incorporated into that ephemeral token.

Such versioning represents another means through which an epoch defines a usable life of each ephemeral token generated during that epoch. For example, a third trigger may be issued when the background process determines that the current system time corresponds to start time 432 of third epoch 430 and third epoch 430 is identified as the current epoch. In response to the third trigger, the particular node computes a third seed value 434 and a third plurality of ephemeral tokens is generated based on the third seed value 434 by the randomization service for populating a third mapping structure 435. The tokenization service is then configured to process tokenization requests for a duration of third epoch 430 using third mapping structure 435.

Upon configuring the tokenization service to process tokenization requests using third mapping structure 435, the tokenization service no longer processes such requests using second mapping structure 425. However, a detokenization service (e.g., detokenization service 280 of FIG. 2) may be configured to process detokenization requests using second mapping structure 425 for the duration of third epoch 430. As illustrated in FIG. 4, the detokenization service may also be configured to process detokenization requests using third mapping structure 435 for the duration of third epoch 430. In one respect, the detokenization service processes detokenization requests using second mapping structure 425 and/or third mapping structure 435 for the duration of third epoch 430 is that ephemeral tokens from the second epoch 420 and/or third epoch 430 may be received by the detokenization service in detokenization requests during third epoch 430. In an embodiment, the detokenization service is configured to identify an particular epoch in which a given ephemeral token is generated using a version identifier of the given ephemeral token.

Another aspect of the present disclosure illustrated by FIG. 4 is that versions of ephemeral tokens may be cyclically reused over time. For example, prior to start time 432, the detokenization service may be configured to process detokenization requests using first mapping structure 415. Subsequent to start time 432, the detokenization process may be configured to no longer process detokenization requests using first mapping structure 415. Yet, at a later time, a new mapping structure may be populated with ephemeral tokens generated during a later epoch associated with version "a".

Figure 5:
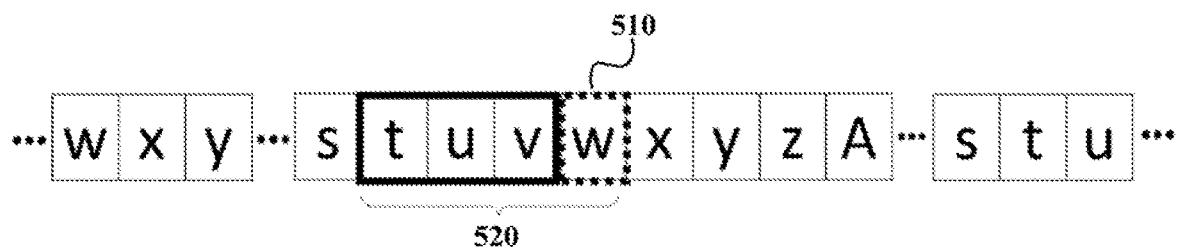
FIG. 5 illustrates an example of ephemeral token versioning at a first time.
Figure 6:
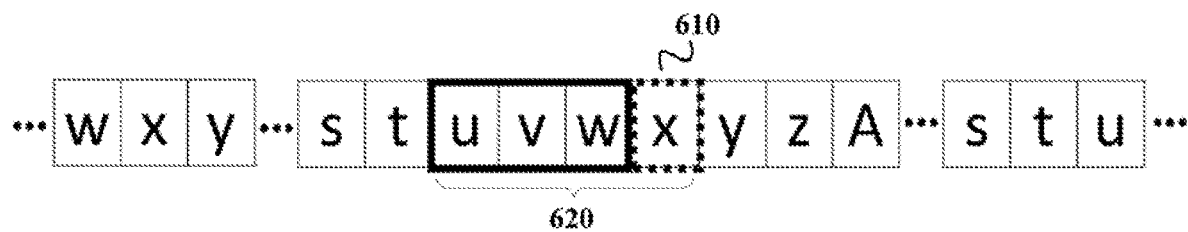
FIG. 6 illustrates the example of ephemeral token versioning at a second time that is subsequent to the first time illustrated in FIG. 5.

FIGS. 5 and 6 illustrate an example of cyclically reusing versions of ephemeral tokens over time. Referring to FIG. 5, an epoch identified as a current epoch at a first time is associated with version "w". In FIG. 5, a tokenization service is configured to process tokenization requests using a mapping structure associated with version "w", as represented by designator 510. At the first time, a detokenization process is configured to process detokenization requests using mapping structures associated with versions "t"-"w", as represented by designator 520.

Referring to FIG. 6, a new epoch is identified as the current epoch at a second time subsequent to the first time. That new epoch is associated with version "x". In FIG. 6, the tokenization service is configured to process tokenization requests using a mapping structure associated with version "x", as represented by designator 610. At the second time, the detokenization process is configured to process detokenization requests using mapping structures associated with versions "u"-"x", as represented by designator 620. As illustrated by FIG. 6, neither the tokenization service nor the detokenization service is configured to process requests using a mapping structure associated with version "t". This illustrates that ephemeral token version "t" has been released at the second time for use at a later time.

Figure 7:
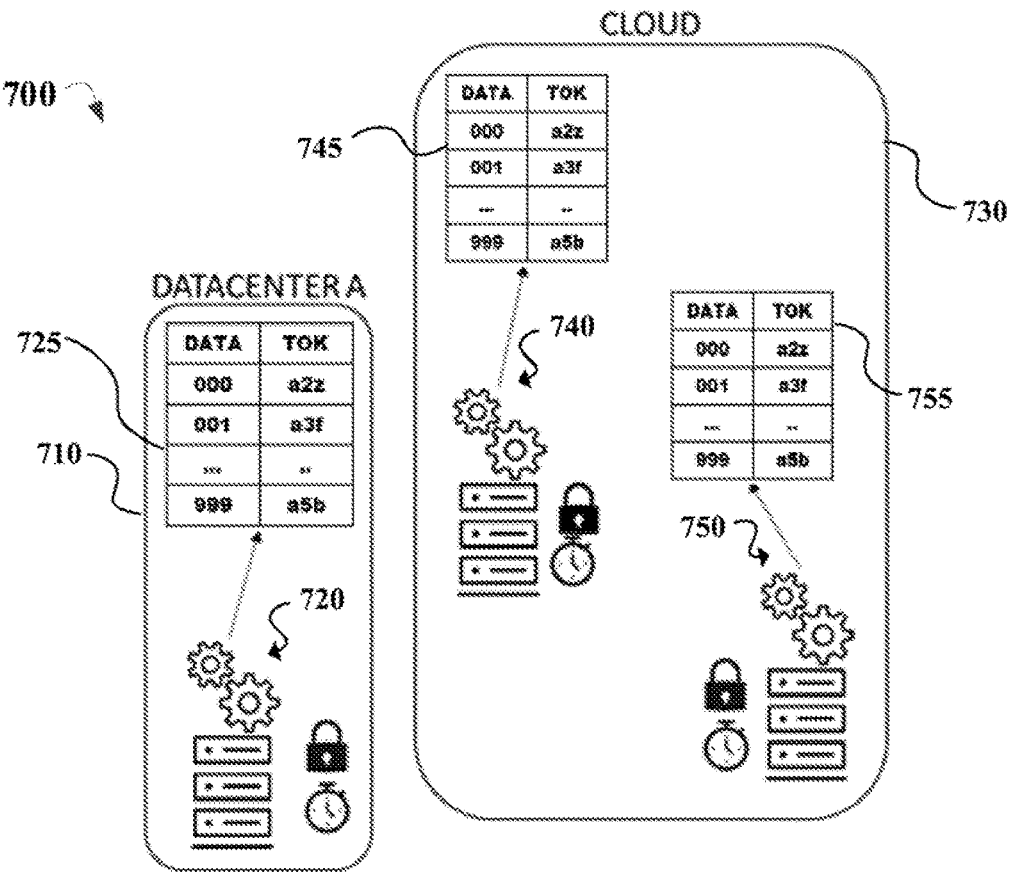
FIG. 7 depicts nodes of a distributed tokenization platform independently creating in-memory sensitive data to ephemeral token mappings without intra-node synchronization, in accordance with an embodiment of the present invention.

Referring to FIG. 7, nodes of distributed tokenization platform 700 are implementing using computing resources distributed among a various computing environments, in accordance with an embodiment of the present disclosure. In FIG. 7, distributed tokenization platform 700 includes node 720 that is implemented using computing resources of datacenter computing environment 710. Distributed tokenization platform 700 further includes nodes 740 and 750 that are implemented using computing resources of cloud computing environment 730. FIG. 7 illustrates that the same mapping structure may be created by each node of distributed tokenization platform 700 in parallel without intra-node synchronization. As discussed above with respect to FIG. 3, one aspect of the present disclosure that facilitates this independent creation of mapping structures is the generation of ephemeral tokens based on locally available data (e.g., a current system time of a respective node and a local copy of a secret).

Moreover, mapping structures remain consistent throughout distributed tokenization platform 700 even if one of the nodes becomes inoperable within a particular epoch. For example, nodes 720 and 750 may remain operable for a duration of the epoch and thereby retain mapping structures 725 and 755 created at a start time of the epoch for that duration. However, node 740 may become inoperable after the start time of an epoch that is identified as a current epoch but before a new epoch is identified as the current epoch. If node 740 is able to return to an operable state before the new epoch is identified as the current epoch, node 740 can determine that the epoch is still identified as the current epoch.

To do so, node 740 may compare its current system time with start times of a plurality of epochs that include the epoch and the new epoch. Upon making that determination, node 740 computes a seed value based on the start time of the epoch and a secret. Using the seed value, a randomization process of node 740 may create mapping structure 745. As illustrated by FIG. 7, mapping structure 745, which was created by the randomization process of node 740 after the start time of the epoch is consistent with mapping structures 725 and 755 that were each created at the start time.

In an embodiment, the computing resources of datacenter computing environment 710 and the computing resources of cloud computing environment 730 are located in different geographical regions. For example, the computing resources of datacenter computing environment 710 may be physically located in Asia whereas the computing resources of cloud computing environment 730 may be physically located in Europe. In an embodiment, the computing resources of datacenter computing environment 710 and the computing resources of cloud computing environment 730 are communicatively coupled via a network.

Figure 8:
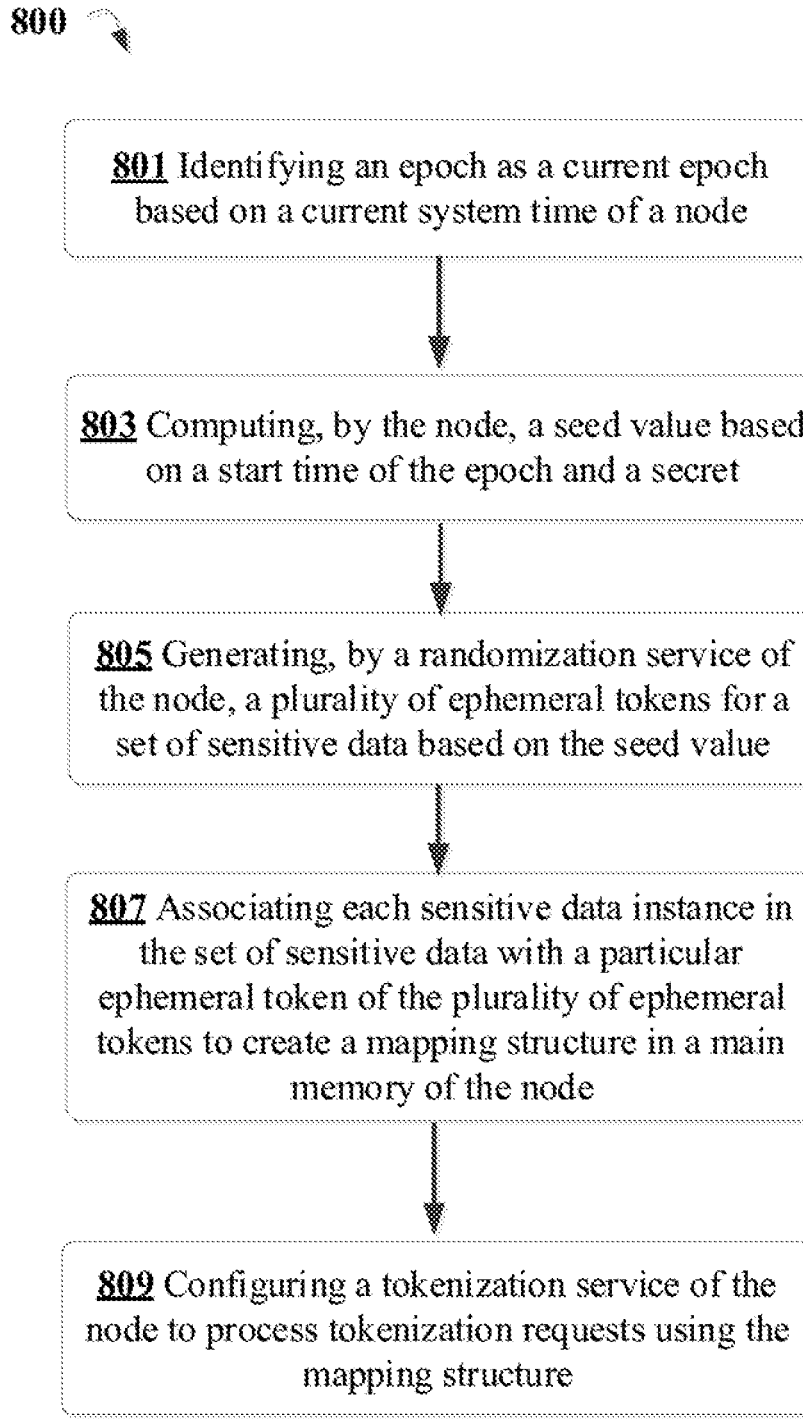
FIG. 8 is a flow-chart illustrating an example of a method of creating in-memory sensitive data to ephemeral token mappings, in accordance with an embodiment of the invention.

FIG. 8 is a flow-chart illustrating an example of a method 800 of creating in-memory sensitive data to ephemeral token mappings, in accordance with an embodiment of the invention. In an embodiment, method 800 is implemented by nodes 132-136 of FIG. 1; node 200 of FIG. 2; or nodes 720, 740, or 750 of FIG. 7. At step 801, an epoch is identified as a current epoch based on a current system time of a node. In an embodiment, the node is one of a plurality of nodes forming a distributed tokenization platform. In an embodiment, the node is implemented in a datacenter environment. In an embodiment, the node is implemented in a cloud computing environment.

At step 803, the node computes a seed value based on a start time of the epoch and a secret. In an embodiment, computing the seed value comprises providing the start time of the epoch and the secret as inputs to a keyed hash operation. In an embodiment, the node retrieves the secret from a hardware security module ("HSM"). In an embodiment, the HSM is a component of the node. In an embodiment, the HSM is external to the node.

At step 805, a randomization service of the node generates a plurality of ephemeral tokens for a set of sensitive data based on the seed value. Each ephemeral token of the plurality of ephemeral tokens has a usable life defined by the epoch. In an embodiment, each ephemeral token among the plurality of ephemeral tokens includes a version identifier associated with the epoch. In an embodiment, generating the plurality of ephemeral tokens comprises identifying a particular token version that is associated with the epoch from among a plurality of token versions. In an embodiment, method 800 further comprises cyclically re-using the plurality of token versions by associating each token version with a new epoch after exhausting the plurality of token versions.

At step 807, each sensitive data instance in the set of sensitive data is associated with a particular ephemeral token of the plurality of ephemeral tokens to create a mapping structure in a main memory of the node. In an embodiment, each node of a plurality of nodes forming a distributed tokenization platform with the node is configured to independently create the mapping structure using the secret without synchronizing with other nodes in the plurality of nodes. In an embodiment, a particular ephemeral token is mapped to a particular sensitive data instance in the set of sensitive data in a respective main memory of each node among the plurality of nodes. At step 809, a tokenization service of the node is configured to process tokenization requests using the mapping structure. In an embodiment, each tokenization request received by the node is processed without accessing a token vault.

In an embodiment, method 800 further comprises periodically refreshing the mapping structure responsive to a new epoch being identified as the current epoch based on the current system time of the node. In an embodiment, periodically refreshing the mapping structure comprises computing, by the node, a new seed value based on a respective start time of the new epoch and the secret. In an embodiment, periodically refreshing the mapping structure comprises computing, by the node, a new seed value based on a respective start time of the new epoch and a new secret that is distinct from the secret.

In an embodiment, method 800 further comprises configuring a detokenization service to process detokenization requests comprising ephemeral tokens with version identifiers associated with the epoch when a new epoch is identified as the current epoch. In an embodiment, the detokenization service is configured to process the detokenization requests by performing reverse lookup operations on the mapping structure. In an embodiment, the detokenization service is executing using computing resources of another node of a system comprising the node that is external to the node.

In an embodiment, method 800 further comprises configuring a tokenization process to process tokenization requests using a new mapping structure associated with a new epoch when the new epoch is identified as the current epoch. In an embodiment, the tokenization service is executing using computing resources of the node. In an embodiment, the tokenization service is executing using computing resources of another node of a system comprising the node that is external to the node.

In an embodiment, method 800 further comprises configuring a detokenization service of the node to process detokenization requests using mapping structures associated with a plurality of epochs. In this embodiment, each epoch of the plurality of epochs is identified as the current epoch before the start time of the epoch. In an embodiment, a particular sensitive data instance in the set of sensitive data is associated with a different ephemeral token in each mapping structure associated with one of the plurality of epochs. In an embodiment, each mapping structure associated with one of the plurality of epochs is created using a different seed value. In an embodiment, each mapping structure associated with one of the plurality of epochs resides in the main memory of the node. In an embodiment, each mapping structure associated with one of the plurality of epochs resides in a respective memory of another node of a system comprising the node that is external to the node.

In an embodiment, method 800 is performed by processing logic, including hardware, firmware, software, or a combination thereof. In an embodiment, method 800 is performed by a processor executing code stored in a non-transitory computer-readable medium (e.g., a memory).

Having described various embodiments of the invention, an exemplary computing environment suitable for implementing embodiments of the invention is now described. With reference to FIG. 9, client device 110; computing device 120; distributed tokenization platform 130; nodes 132-136, 200, 720, 740, and 750; datacenter computing environment 710; and cloud computing environment 730 may be implemented on one or more computer devices or systems, such as exemplary computer system 900. The computer system 900 may include a processor 926, a memory 928, a mass storage memory device 930, an input/output (I/O) interface 932, and a Human Machine Interface (HMI) 934. The computer system 900 may also be operatively coupled to one or more external resources 936 via the network 923 or I/O interface 932. External resources may include, but are not limited to, servers, databases, mass storage devices, peripheral devices, cloud-based network services, or any other suitable computer resource that may be used by the computer system 900.

The processor 926 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 928. The memory 928 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 930 may include data storage devices such as a hard drive, optical drive, tape drive, non-volatile solid state device, or any other device capable of storing information.

The processor 926 may operate under the control of an operating system 938 that resides in the memory 928. The operating system 938 may manage computer resources so that computer program code embodied as one or more computer software applications, such as an application 940 residing in memory 928, may have instructions executed by the processor 926. In an alternative embodiment, the processor 926 may execute the application 940 directly, in which case the operating system 938 may be omitted. One or more data structures 942 may also reside in memory 928, and may be used by the processor 926, operating system 938, or application 940 to store or manipulate data.

The I/O interface 932 may provide a machine interface that operatively couples the processor 926 to other devices and systems, such as the network 923 or the one or more external resources 936. The application 940 may thereby work cooperatively with the network 923 or the external resources 936 by communicating via the I/O interface 932 to provide the various features, functions, applications, processes, or modules comprising embodiments of the invention. The application 940 may also have program code that is executed by the one or more external resources 936, or otherwise rely on functions or signals provided by other system or network components external to the computer system 900. Indeed, given the nearly endless hardware and software configurations possible, persons having ordinary skill in the art will understand that embodiments of the invention may include applications that are located externally to the computer system 900, distributed among multiple computers or other external resources 936, or provided by computing resources (hardware and software) that are provided as a service over the network 923, such as a cloud computing service.

The HMI 934 may be operatively coupled to the processor 926 of computer system 900 in a known manner to allow a user to interact directly with the computer system 900. The HMI 934 may include video or alphanumeric displays, a touch screen, a speaker, and any other suitable audio and visual indicators capable of providing data to the user. The HMI 934 may also include input devices and controls such as an alphanumeric keyboard, a pointing device, keypads, pushbuttons, control knobs, microphones, etc., capable of accepting commands or input from the user and transmitting the entered input to the processor 926.

A database 944 may reside on the mass storage memory device 930, and may be used to collect and organize data used by the various systems and modules described herein. The database 944 may include data and supporting data structures that store and organize the data. In particular, the database 944 may be arranged with any database organization or structure including, but not limited to, a relational database, a hierarchical database, a network database, or combinations thereof. A database management system in the form of a computer software application executing as instructions on the processor 926 may be used to access the information or data stored in records of the database 944 in response to a query, where a query may be dynamically determined and executed by the operating system 938, other applications 940, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system comprising:
   a node comprising a main memory, a randomization service, and a tokenization service;
   a processor; and
   a computer-readable storage medium comprising instructions that upon execution by the processor cause the system to perform operations, the operations comprising:
     identifying an epoch as a current epoch based on a current system time of the node;
     computing, by the node, a seed value based on a start time of the epoch and a secret;
     generating, by the randomization service, a plurality of ephemeral tokens for a set of sensitive data based on the seed value, each ephemeral token having a usable life defined by the epoch;
     associating each sensitive data instance in the set of sensitive data with a particular ephemeral token of the plurality of ephemeral tokens to create a mapping structure in the main memory; and
     configuring the tokenization service to process tokenization requests using the mapping structure,
     wherein the node is one of a plurality of nodes forming a distributed tokenization platform, and wherein each node of the plurality of nodes is configured to independently create the mapping structure using the secret without synchronizing with other nodes in the plurality of nodes.

2. The system of claim 1, wherein each tokenization request received by the node is processed without accessing a token vault.

3. The system of claim 1, wherein computing the seed value comprises:
   providing the start time of the epoch and the secret as inputs to a keyed hash operation.

4. The system of claim 1, wherein the instructions, when executed, further cause the system to perform additional operations, the additional operations comprising:
   periodically refreshing the mapping structure responsive to a new epoch being identified as the current epoch based on the current system time of the node.

5. The system of claim 4, wherein periodically refreshing the mapping structure comprises:
   computing, by the node, a new seed value based on a respective start time of the new epoch and the secret.

6. The system of claim 1, wherein a detokenization service performs reverse lookup operations on the mapping structure while processing detokenization requests comprising ephemeral tokens with version identifiers associated with the current epoch of each of the ephemeral tokens.

7. The system of claim 6, wherein the detokenization service is executing using computing resources of another node of the system external to the node.

8. The system of claim 6, wherein the instructions, when executed, further cause the system to perform additional operations, the additional operations comprising:
   configuring the tokenization service to process tokenization requests using a new mapping structure associated with a new epoch.

9. A method comprising:
   identifying an epoch as a current epoch based on a current system time of a node;
   computing, by the node, a seed value based on a start time of the epoch and a secret;
   generating, by a randomization service of the node, a plurality of ephemeral tokens for a set of sensitive data based on the seed value, each ephemeral token having a usable life defined by the epoch;
   associating each sensitive data instance in the set of sensitive data with a particular ephemeral token of the plurality of ephemeral tokens to create a mapping structure in a main memory of the node; and
   configuring a tokenization service of the node to process tokenization requests using the mapping structure,
   wherein the node is one of a plurality of nodes forming a distributed tokenization platform, and wherein each node of the plurality of nodes is configured to independently create the mapping structure using the secret without synchronizing with other nodes in the plurality of nodes.

10. The method of claim 9, further comprising:
    configuring a detokenization service of the node to process detokenization requests using mapping structures associated with a plurality of epochs, wherein each epoch of the plurality of epochs is identified as the current epoch before the start time of the epoch.

11. The method of claim 10, wherein a particular sensitive data instance in the set of sensitive data is associated with a different ephemeral token in each mapping structure associated with one of the plurality of epochs.

12. The method of claim 10, wherein each mapping structure associated with one of the plurality of epochs is created using a different seed value.

13. The method of claim 10, wherein each mapping structure associated with one of the plurality of epochs resides in the main memory of the node.

14. The method of claim 9, wherein each ephemeral token among the plurality of ephemeral tokens includes a version identifier associated with the epoch.

15. The method of claim 9, wherein generating the plurality of ephemeral tokens comprises:

identifying a particular token version that is associated with the epoch from among a plurality of token versions.

16. The method of claim 15, further comprising:

cyclically re-using the plurality of token versions by associating each token version with a new epoch after exhausting the plurality of token versions.

17. The method of claim 9, wherein a particular ephemeral token is mapped to a particular sensitive data instance in the set of sensitive data in a respective main memory of each node among the plurality of nodes.

18. A non-transitory computer-readable storage medium comprising computer-readable instructions that upon execution by a processor of a computing device cause the computing device to:

identify a first epoch as a current epoch based on a current system time of a node;

compute, by the node, a seed value based on a start time of the first epoch and a secret;

generate, by a randomization service of the node, a plurality of ephemeral tokens for a set of sensitive data based on the seed value, each ephemeral token having a usable life defined by the first epoch;

associate each sensitive data instance in the set of sensitive data with a particular ephemeral token of the plurality of ephemeral tokens to create a mapping structure in a main memory of the node; and configure a tokenization service of the node to process tokenization requests using the mapping structure, wherein the node is one of a plurality of nodes forming a distributed tokenization platform, and wherein each node of the plurality of nodes is configured to independently create the mapping structure using the secret without synchronizing with other nodes in the plurality of nodes.

* * * * *